(12) United States Patent
Platt et al.

(10) Patent No.: US 11,210,598 B2
(45) Date of Patent: Dec. 28, 2021

(54) EXTRAPOLATING PROBABILISTIC PREDICTIONS FOR SKILLS USING UNANSWERED QUESTIONS AND DETERMINING CORRESPONDING INSTRUCTIONAL CONTENT

(71) Applicant: Pluralsight, LLC, Farmington, UT (US)

(72) Inventors: David Platt, Bountiful, UT (US); David Mashburn, Boston, MA (US); Krishna Kannan, Boston, MA (US); Eric Stone, Boston, MA (US)

(73) Assignee: PLURALSIGHT, LLC, Farmington, UT (US)

( * ) Notice: Subject to any disclaimer, the term of this patent is extended or adjusted under 35 U.S.C. 154(b) by 1007 days.

(21) Appl. No.: 15/630,245

(22) Filed: Jun. 22, 2017

(65) Prior Publication Data

US 2017/0372215 A1 Dec. 28, 2017

Related U.S. Application Data

(60) Provisional application No. 62/354,046, filed on Jun. 23, 2016.

(51) Int. Cl.
*G06N 7/00* (2006.01)
*G06F 16/2455* (2019.01)
(Continued)

(52) U.S. Cl.
CPC ............ *G06N 7/005* (2013.01); *G06F 16/242* (2019.01); *G06F 16/245* (2019.01);
(Continued)

(58) Field of Classification Search
CPC ........ G06N 7/005; G06N 20/00; G06N 3/006; G06F 16/242; G06F 16/245; G06F 16/2455; G09B 5/06; G09B 7/02
See application file for complete search history.

(56) References Cited

U.S. PATENT DOCUMENTS 7,286,793 B1 10/2007 Miele
9,116,974 B2 8/2015 Heit et al.
(Continued)

FOREIGN PATENT DOCUMENTS

WO 2015065327 A1 5/2015

OTHER PUBLICATIONS

Zachary, Pardos, "Using Fine-Grained Skill Models to Fit Student performance with Bayesian Networks", (Year: 2010).*

(Continued)

*Primary Examiner* — Ann J Lo
*Assistant Examiner* — Van C Mang
(74) *Attorney, Agent, or Firm* — Kilpatrick Townsend & Stockton, LLP

(57) ABSTRACT

A system and method for providing customized content recommendations to a user based on extrapolated data is described. The system may receive an answer to a question from a user and determine a second unanswered question having a threshold relationship level with the question. The system may compute a predicted probability that the user would answer the second question correctly, calculate a first comparative skill level of the user among a cohort of similar users, and rank the first comparative skill level of the user against a second comparative skill level of the cohort to determine a skill gap of the user. Further, in some implementations, the system may generate a search query based on the skill gap of the user, and determine recommended content customized to the skill gap of the user.

17 Claims, 7 Drawing Sheets

(51) Int. Cl.

| | |
|---|---|
| *G06F 16/242* | (2019.01) |
| *G06N 20/00* | (2019.01) |
| *G06F 16/245* | (2019.01) |
| *G06N 3/00* | (2006.01) |
| *G09B 5/06* | (2006.01) |
| *G09B 7/02* | (2006.01) |

(52) U.S. Cl.
CPC ......... *G06F 16/2455* (2019.01); *G06N 3/006* (2013.01); *G06N 20/00* (2019.01); *G09B 5/06* (2013.01); *G09B 7/02* (2013.01)

(56) References Cited

U.S. PATENT DOCUMENTS

| | | | |
|---|---|---|---|
| 9,542,853 B1* | 1/2017 | Bergeron | G09B 23/30 |
| 9,667,321 B2* | 5/2017 | Rho | G09B 7/02 |
| 2005/0283474 A1 | 12/2005 | Francis et al. | |
| 2007/0124425 A1* | 5/2007 | Gross | G06Q 30/0277 |
| | | | 709/217 |
| 2010/0068687 A1 | 3/2010 | Bertelsen | |
| 2012/0303965 A1 | 11/2012 | Carter | |
| 2013/0034837 A1 | 2/2013 | Clapp et al. | |
| 2013/0262453 A1 | 10/2013 | Lin et al. | |
| 2013/0297553 A1 | 11/2013 | Bierner | |
| 2013/0325779 A1* | 12/2013 | Shahshahani | G06N 5/00 |
| | | | 706/46 |
| 2016/0065519 A1 | 3/2016 | Watermann et al. | |
| 2016/0171094 A1 | 6/2016 | Byron et al. | |
| 2017/0154307 A1* | 6/2017 | Maurya | H04L 67/306 |

OTHER PUBLICATIONS

Fawaz, "Toward an enhanced Arabic Text classification using cosine similarity and Latent Semantic indexing", ScienceDirect, 2016 (Year: 2016).*
First Examination Report dated Nov. 2, 2019 in related application No. AU 2017281763, all pgs.
Extended European Search Report dated Jan. 23, 2020 in related application No. EU 17816203.8, all pgs.
International Search Report and Written Opinion for PCT/US17/38724, dated Sep. 12, 2017, 17 pages.
First Examiner Report dated Sep. 2, 2019 in related foreign New Zealand application No. New Zealand 749609, 10 pgs.

* cited by examiner

EXTRAPOLATING PROBABILISTIC PREDICTIONS FOR SKILLS USING UNANSWERED QUESTIONS AND DETERMINING CORRESPONDING INSTRUCTIONAL CONTENT

CROSS REFERENCE TO RELATED APPLICATIONS

The present application claims priority, under 35 U.S.C. § 119, of U.S. Provisional Patent Application No. 62/354,046, filed Jun. 23, 2016 and entitled "Courses, Adaptive Testing, and Learning Paths," which is incorporated by reference in its entirety.

BACKGROUND

The specification generally relates to extracting meaningful data from unanswered skill assessment questions using computer algorithms. In particular, the specification relates to a system and method for extrapolating probabilistic predictions for skills using unanswered questions and determining content for improving those skills.

Increasingly, online education has become popular as a convenient and effective means for learning. Online education companies may provide courses and modules, which allow a user to learn about a particular subject. In some situations, an education provider may provide an assessment to determine a comprehension level of a user.

Current skill assessments only accurately measure broad skills, but not a user's skill level on the subjects and subtopics that comprise a skill. Additionally, in some situations, subjects can be highly complex or require numerous questions in order to properly assess a user's skill level, particularly when that subject includes several topics. In some instances, a large number of questions are asked to determine a user's skill level among a variety of skills; however, users may not have the time or desire to answer all of these questions resulting in an incomplete understanding of a particular user's set of skills and therefore of the user's educational needs.

SUMMARY

The techniques introduced herein overcome the deficiencies and limitations of the prior art, at least in part, with a system and method for extrapolating skill levels from a subset of all assessment questions and generating recommendations customized to the user's skill level for one or more topics. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, by a computing device, an answer to a question of a set of questions from a first user, the set of questions including an unanswered question to which a response is not received from the first user; computing, by the computing device, a predicted probability of the first user answering the unanswered question correctly using the answer to the question and based on question mapping data, the question mapping data representing a relationship between the question and the unanswered question; determining, by the computing device, a skill gap of the first user based on the answer to the question and the predicted probability of the first user answering the unanswered question correctly, the skill gap representing competence of the first user in a topic; determining, by the computing device, recommended instructional content customized to the skill gap of the first user; and providing, by the computing device, for display to the first user, the recommended instructional content customized to the skill gap of the first user. Other embodiments of this aspect include corresponding computer systems, apparatus, and computer programs recorded on one or more computer storage devices, each configured to perform the actions of the methods.

Implementations may include one or more of the following features. The method further including: aggregating, by the computing device, pairs of questions in the set of questions, the pairs of questions being answered by a threshold number of second users; calculating, by the computing device, a probability of a first question in each pair of questions being answered correctly based on responses to a second question in each pair of questions based on responses by the threshold number of second users to that pair of questions; and storing, by the computing device, as question mapping data, the probability of the first question in each pair of questions being answered correctly based on the responses to the second question in each pair of questions. The method where calculating the probability of the first question in each pair of questions being answered correctly based on the responses to the second question in each pair of questions is performed using Bayes' Theorem. The method where determining the recommended instructional content customized to the skill gap of the first user includes: generating, by the computing device, a search query based on the skill gap of the first user; and searching, by the computing device, a database of instructional content using the search query. The method further including generating, by the computing device, the database of instructional content including: generating content documents representing content items; generating topic documents representing topics; and mapping the content items to the topics using the content documents and the topic documents. The method where mapping the content items to the topics includes: determining an importance of terms in the content documents and the topic documents using a term frequency-inverse document frequency matrix; and mapping the content items to the topics using cosine similarity and the importance of terms in the content documents and the topic documents. The method where calculating the skill gap of the first user includes: determining a plurality of topic scores of the first user for topics based on a topic map, the topic map including a mapping between topics and questions in the set of questions, the plurality of topic scores representing a skill level of the first user in the topics; and determining the skill gap of the first user based on a topic score of the first user satisfying a threshold score. The method where the threshold score is defined relative to a cohort of second users, the cohort of second users having a threshold level of similarity to the first user. The method further including determining, by the computing device, the cohort of second users, where determining the cohort of second users includes: calculating a skill level of the first user based on the answer to the question and the predicted probability of the first user answering the unanswered question correctly, the skill level representing level of skill of the first user in one or more topics; ranking the skill level of the first user against skill levels of a plurality of second users; and defining the cohort to include similar users of the plurality of second users to the first user based on the ranked skill level. Implementations of the described techniques may include hardware, a method or process, or computer software on a computer-accessible medium.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

The systems and methods described herein for extrapolating skill levels from a limited set of questions or an incomplete assessment (e.g., an assessment with both answered and unanswered questions) and generating recommendations customized to the user's skill level for one or more topics of the skill. An assessment may include one or multiple questions designed to test a person's skill or level of knowledge across one or more subjects.

In some implementations of the techniques described herein, a user may take an assessment and the system evaluates the user based on the assessment to determine a user's level of skill (e.g., novice, proficient, expert, etc.) for a subject (e.g., mathematics, English, engineering, JavaScript® CSS, HTML, etc.). The system may then provide recommendations to the user based on the user's level of skill for the subject. In some instances, the recommendations may include a specific course, module, or learning path (e.g., a series of modules and/or courses) for a topic. In other instances, the system may curate a customized learning path using multiple courses or modules to fill gaps in the user's understanding of one or more topics.

In particular, according to the techniques described herein, an assessment engine 130 may assess a user's performance on one or more topics based on a user answering a quantity (e.g., 20) of questions among a pool questions from an assessment that may contain hundreds of questions. The assessment engine 130 may extrapolate the answered question data across additional, unanswered questions, thereby providing additional data that the assessment engine 130 may then use to build content recommendations customized for the user.

Figure 1:
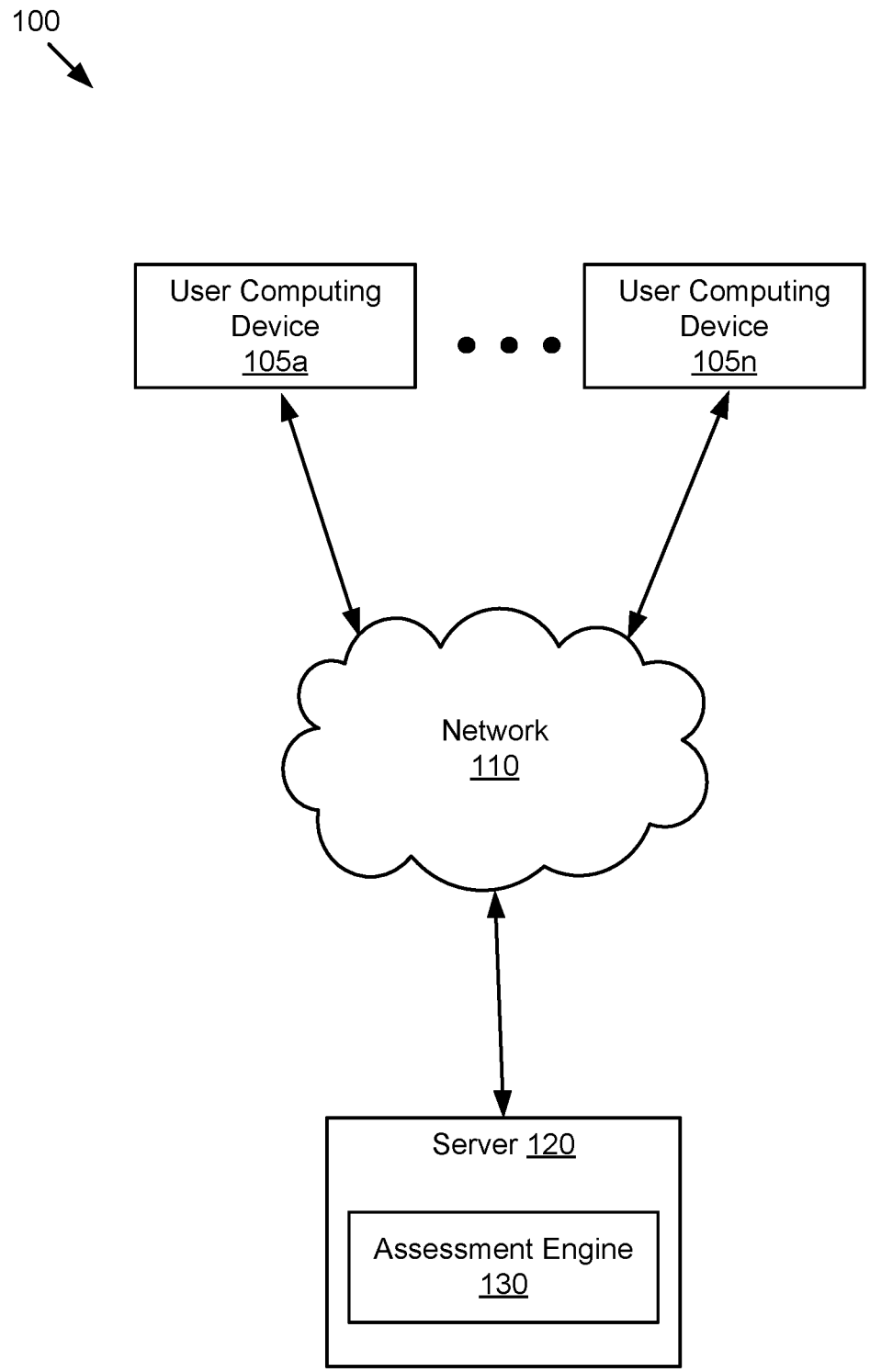
FIG. 1 is a high-level block diagram illustrating an example implementation of a system for determining skill gaps based on limited skills assessment information to provide recommended courses for improving those skills.

FIG. 1 is a high-level block diagram illustrating one implementation of a system 100 for extrapolating skill levels from a limited set of questions or an incomplete assessment and generating recommendations customized to the user's skill level for one or more topics. The illustrated system 100 may have one or more user computing devices 105a . . . 105n, that can be accessed by users, and a server 120. In FIG. 1 and the remaining figures, a letter after a reference number, e.g., "105a," represents a reference to the element having that particular reference number. A reference number in the text without a following letter, e.g., "105," represents a general reference to instances of the element bearing that reference number.

In the illustrated implementation, the entities of the system 100 are communicatively coupled via a network 110. The network 110 can be a wired or wireless, and may have numerous different configurations including a star configuration, token ring configuration, or other configurations. Furthermore, the network 110 may include a local area network (LAN), a wide area network (WAN) (e.g., the Internet), and/or other interconnected data paths across which multiple devices may communicate. In some implementations, the network 110 may be a peer-to-peer network. The network 110 may also be coupled to or include portions of a telecommunications network for sending data in a variety of different communication protocols. In some implementations, the network 110 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 110 coupled to the user computing devices 105 and the server 120, in practice one or more networks 110 can be connected to these entities.

In some implementations, the system 100 includes a server 120 coupled to the network 110. In some implementations, the server 120 may be either a hardware server, a software server, or a combination of software and hardware. The server 120 may be, or may be implemented by, a computing device including a processor, a memory, applications, a database, and network communication capabilities. In the example of FIG. 1, the components of the server 120 are configured to implement an assessment engine 130 described in more detail below. In one implementation, the server 120 sends questions to a user, receives input designating responses to the questions, analyzes the responses of the user against a database and other users' responses to recommend and provide content to the user.

The server 120 may be configured to provide text, multimedia content, (e.g., instructional videos, forums, an IDE, or the like) and/or other types of content to a user computing device 105. In some implementations, the server 120 may be configured to execute the assessment engine 130, although the assessment engine 130 may be executed by the user computing device 105 or distributed among one or more of the user computing device 105, the server 120, and one or more other computing devices.

In some implementations, the server 120 may further be configured to track user interaction with the multimedia content. For example, the server 120 may track the number of plays an instructional video receives, the number of times and location of where the instructional video was paused, the number of times the instructional video was watched to completion, etc. Further, the server 120 may identify and maintain tags associated with the multimedia content.

In some implementations, the server 120 sends and receives data to and from other entities of the system 100 via the network 110. For example, the server 120 sends and receives data, such as questions and answers to the questions, to and from the user computing devices 105a . . . n. Although only a single server 120 is shown in FIG. 1, it should be understood that there may be any number of servers 120 or a server cluster.

The user computing device 105 may be a computing device that includes a memory, a processor, a camera, a microphone, etc. For example, the user computing device may be a laptop computer, a desktop computer, a tablet computer, a mobile telephone, a smartphone, a personal digital assistant (PDA), a mobile email device, a webcam, a user wearable computing device, or any other electronic device capable of accessing a network 110. The user computing device 105 may be configured to provide general graphics and multimedia processing for applications. For example, the user computing device 115 may include a graphics processor unit (GPU) for handling graphics and multimedia processing. The user computing device 105 may include a display and browser for viewing information provided by the server 120. While FIG. 1 illustrates two user computing devices 105a and 105n, the disclosure applies to a system architecture having one or more user computing devices 105.

The user computing device 105 is adapted to send and receive data to and from the server 120. In one implementation, users may use the user computing device 105 to access, via the network 110, content from the server 120 and display the returned content to a user. In another implementation, authors may use a user computing device 105 to send, via the network 110, content to the server 120. While the user computing device 105 may be used to access questions from the server 120, the user computing device may also be used to send responses to questions received from the server 120.

Figure 2:
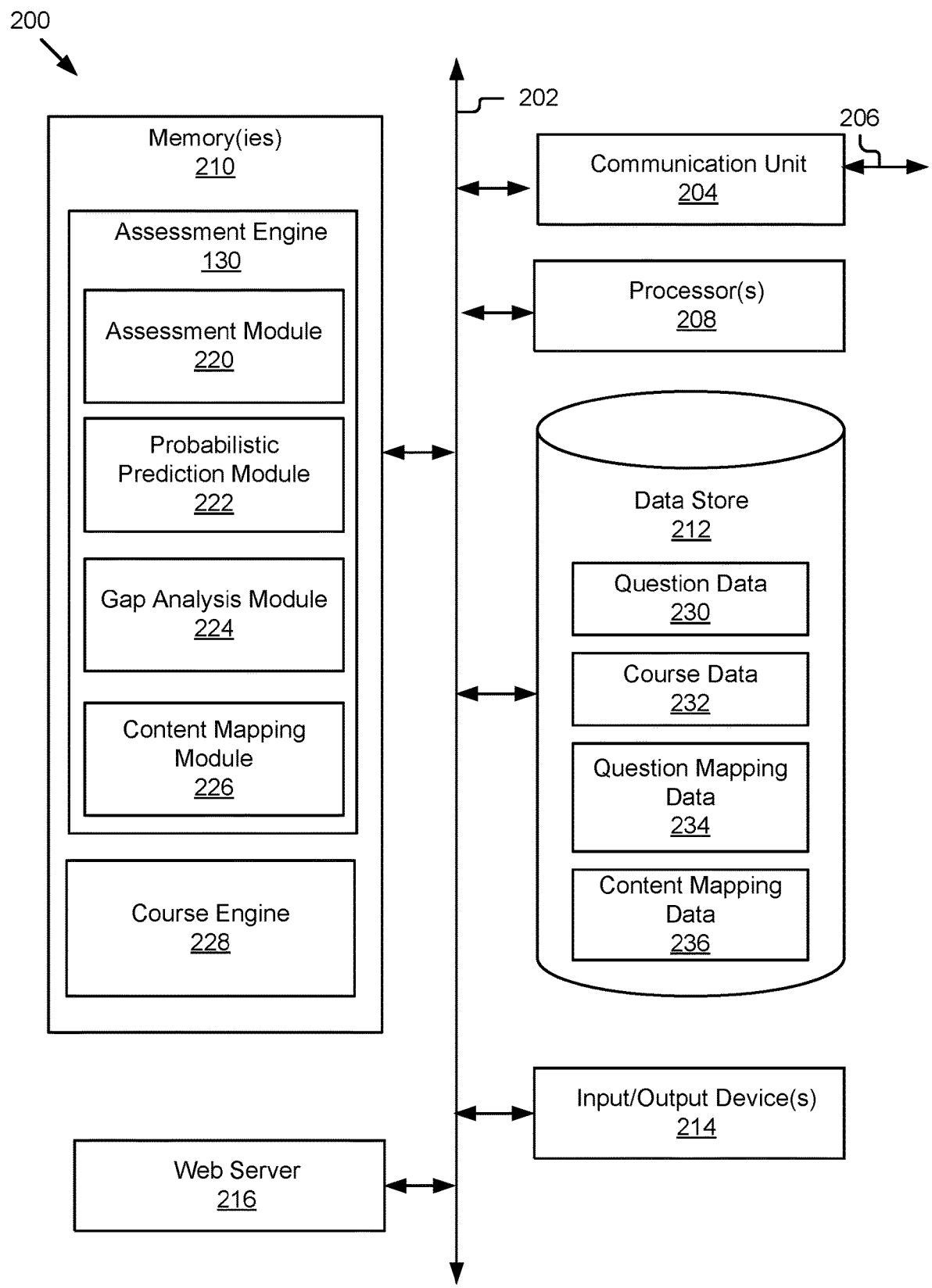
FIG. 2 is a block diagram illustrating an example computing device for implementing the techniques described herein.

FIG. 2 is a block diagram of an example computing system 200, which may represent the computer architecture of a server 102 or user computing device 105, as depicted in FIG. 1, for example, depending on the implementation. As depicted in FIG. 2, the computing system 200 may include a communication unit 204, a processor(s) 208, a memory(ies) 210, a data store 212, an input/output device(s) 214, and/or a web server 216, connected by a communication bus 202, depending on the configuration. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. Although, for purposes of clarity, FIG. 2 only shows a single communication unit 204, processor 208, memory 210, input/output device(s) 214, and data store 212, it should be understood that the computing system 200 may include a plurality of one or more of these components.

The bus 202 can include a communication bus for transferring data between components of a computing system or between computing devices, a network bus system including the network 110 or portions thereof, a processor mesh, a combination thereof, etc. In some implementations, an assessment engine 130, a course engine 228, a web server 216, and various other components operating on the computing system 200 (operating systems, device drivers, etc.) may cooperate and communicate via a communication mechanism included in or implemented in association with the bus 202. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 204 may include one or more interface devices (I/F) for wired and wireless connectivity among the components of the system 100. For instance, the communication unit 204 may include, but is not limited to, various types known connectivity and interface options. The communication unit 204 may be coupled to the other components of the computing system 200 via the bus 202. The communication unit 204 may be coupled to the network 110 as illustrated by the signal line 206, depending on the configuration. In some implementations, the communication unit 204 can link the processor(s) 208 to the network 110, which may in turn be coupled to other processing systems. The communication unit 204 can provide other connections to the network 110 and to other entities of the system 100 using various communication protocols.

The processor 208 may execute software instructions by performing various input, logical, and/or mathematical operations. The processor 208 may have various computing architectures including, for example, a complex instruction set computer (CISC) architecture, a reduced instruction set computer (RISC) architecture, and/or an architecture implementing a combination of instruction sets. The processor 208, which may include one or more processors, may be physical and/or virtual, and may include a single core or plurality of processing units and/or cores. In some implementations, the processor 208 may be capable of generating and providing electronic display signals to a display device, supporting the display of images, capturing and transmitting data, performing complex tasks including various types of feature extraction and sampling, etc. In some implementations, the processor 208 may be coupled to the memory 210 via the bus 202 to access data and instructions therefrom and store data therein. The bus 202 may couple the processor 208 to the other components of the computing system 200 including, for example, the memory 210, the communication unit 204, the input/output device 214, the data store 212, and the web server 216.

The memory 210 may store and provide access to data to the other components of the computing system 200. The memory 210 may be included in a single computing device or a plurality of computing devices. In some implementations, the memory 210 may store instructions and/or data that may be executed by the processor 208. For example, the memory 210 may store one or more of an assessment engine 130, a course engine 228, and a web server 216, and their respective components, depending on the configuration. The memory 210 is also capable of storing other instructions and data, including, for example, an operating system, hardware drivers, other software applications, databases, etc. The memory 210 may be coupled to the bus 202 for communication with the processor 208 and the other components of computing system 200.

The memory 210 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 208. In some implementations, the memory 210 may include one or more of volatile memory and non-volatile memory (e.g., RAM, ROM, hard disk, optical disk, etc.). It should be understood that the memory 210 may be a single device or may include multiple types of devices and configurations.

The components 130, 228, and/or 216 can be implemented using programmable or specialized hardware including a field-programmable gate array (FPGA) or an application-specific integrated circuit (ASIC). In some implementations, the components 130, 228, and/or 216 can be implemented using a combination of hardware and software executable by processor 208. In some implementations, the components 130, 228, and/or 216 may be sets of instructions executable by the processor 208. In some implementations, the assessment engine 130, course engine 228, and web server 216, and their respective components may include computer logic executable by the processor 208 to perform the operations and provide the features described herein. In some implementations, the components 130, 228, and/or 216 are stored in the memory 210 and are accessible and executable by the processor 208. The assessment engine 130, course engine 228, and web server 216 may communicate with the other components of the computing system 200. In some implementations, the components 130, 228, and/or 216 are adapted for cooperation and communication with the processor 208, the memory 210, the data store 212, and other components of the computing system 200 via the bus 202.

The assessment engine 130 and its components perform the operations described herein for extrapolating skill levels from a limited set of questions or an incomplete assessment and generating recommendations customized to the user's skill level for one or more topics. The assessment engine 130 may include an assessment module 220, a probabilistic prediction module 222, a gap analysis module 224, and a content mapping module 226, depending on the configuration. The components 220, 222, 224, and 226 and their operations are described in further detail throughout this description, for example, in reference to FIGS. 3-6.

In some implementations, the assessment engine 130 may calculate a user score, a question score, and/or uncertainty in a user and question score. Users of a server 120, a user computing device 105, online education provider, or online testing system may have an overall skill rating or user score, or in another implementation, may have a user score in specific categories (e.g., subjects, topics, subtopics, etc.). The user score may be made up of various components measuring a skill of a user to provide an overall sketch of the user's aptitude. In some implementations, a user may have an overall score and different user scores for different technical areas. In some implementations, the assessment engine 130 identifies an overall proficiency level for a user based on the user score. For example, the assessment engine 130 may classify a user as an expert, a proficient user, a beginner user, etc., based on defined threshold user scores/proficiency levels.

The course engine 228 provides educational content to the user, for example, via the web server 216 or on a user computing device. For example, the course engine 228 may use content recommendations made by the content mapping module 226 to suggest and provide content to the user. In some instances, the course engine 228 may be configured to provide content items, such as entire courses, modules, and/or learning paths to a user based on the determined recommendations.

The data store 212 is an information source for storing and providing access to data. The data stored by the data store 212 may be organized and queried using various criteria including any type of data stored by them, such as a user identifier, question data or attributes, relationships between questions, course data or attributes, content mapping data, tags, etc. The data store 212 may include data tables, databases, or other organized collections of data. Examples of the types of data stored by the data store 212 may include, but are not limited to, question data 230, course data 232, question mapping data 234, and/or content mapping data 236. In some instances, the data store 212 may also include user profile data or other types of data.

Question data 230 may include questions and answer keys. The questions may be organized into assessments, subjects, topics, subtopics, etc. The question data 230 may include the text of questions, attributes of questions (e.g., skill tested, type of question, difficulty level, etc.), question identifiers, etc. In some implementations, the question data 230 may include statistics regarding the number of users who answered a given question, question ratings and feedback, how often users answer a given question correctly, etc. In some implementations, the question data 230 may be organized using a PostgreSQL database or other object-relational database management system.

Course data 232 may include educational content. The educational content may include textual data, assessments, project-based learning, assignments, audio or audio-visual content, etc., which may be organized into content items, such as courses, modules, learning paths, etc. The course data 232 may include content, titles, descriptions, author information, content transcriptions (e.g., course transcriptions) and other content attributes. For example, the course data 232 may include a document having a description, title, clip or module titles, author, topics, etc., describing the course or other content item.

Question mapping data 234 may include data linking questions together and/or describing questions. For example, question mapping data 234 may include relationships between questions, correlations between how frequently users answer two or more questions correctly or incorrectly, etc. In some implementations, the question mapping data 234 may include calculated probabilities that a user may answer a second, unanswered question correctly given the user's answer to a first question. The question mapping data 234 may be updated periodically to reflect current trends in users' understanding (e.g., whether there is a correlation between two questions answered by multiple users). For example, the question mapping data 234 may receive asynchronous regular updates from a database read slave, for instance, from the question data 230 to update the questions and mappings.

Although not illustrated in FIG. 2, the data store 212 may also include user data, such as profile data, assessment and probabilistic prediction information, progress through educational content, skill scores, skill levels, user preferences, etc.

Content mapping data 236 may include a mapping of assessment subjects, topics, subtopics, etc., to content (e.g., courses, modules, learning paths, etc.). The content mapping data 236 may include documents and/or matrices (e.g., TF-IDF or term frequency-inverse document frequency matrices, for example, as described below) for content. In some implementations, content mapping data 236 is calculated in advance, stored in the data store 212, and updated periodically to represent relationships among current subjects, topics, subtopics, and content. In some implementations, the content mapping data 236 may be calculated by the content mapping module 226 in real time to provide customized recommendations specific to a user, as described in further detail elsewhere herein.

The input/output device(s) 214 may include any device for inputting or outputting information into the computing system 200. For example, the input/output device(s) 214 may include one or more input devices, such as a keyboard, a pointing device, microphone, an image/video capture device (e.g., camera), a touch-screen display, etc. The input/output device(s) 214 may include one or more output devices, such as one or more of a display (LCD, OLED, etc.), a printer, a haptic device, audio reproduction device, touch-screen display, etc. In some implementations, the output device is a display, which may display electronic images and data output by the computing system 200 for presentation to a user (e.g., an administrator of the server 120). In some implementations, the computing system 200 may include a graphics adapter (not shown) for rendering and outputting the images and data for presentation on an output device. The graphics adapter (not shown) may be a separate processing device including a separate processor and memory (not shown) or may be integrated with the processor 208 and memory 210.

The web server 216 may include computer logic executable by the processor 208 to respond to content requests. The web server 216 may include an HTTP server, a REST (representational state transfer) service, or other suitable server type. The web server 216 may receive content requests (e.g., product search requests, HTTP requests) from user computing devices 105, cooperate with the course engine 228 to determine the content, retrieve and incorporate data from the data store 212, format the content, and provide the content to the user computing devices 105.

In some instances, the web server 216 may format the content using a programming language and provide the content to a corresponding user computing device 105 (e.g., as specialized code executable on a web browser or within a specialized user application) for processing and/or rendering to the user for display.

The web server 216 may be coupled to the data store 212 to store, retrieve, and/or manipulate data stored therein, and may be coupled to the assessment engine 130 and course engine 228 to facilitate their operations. For example, the web server 216 facilitate communication between a user computing device 105 and the assessment engine 130 and/or course engine 228.

Figure 3:
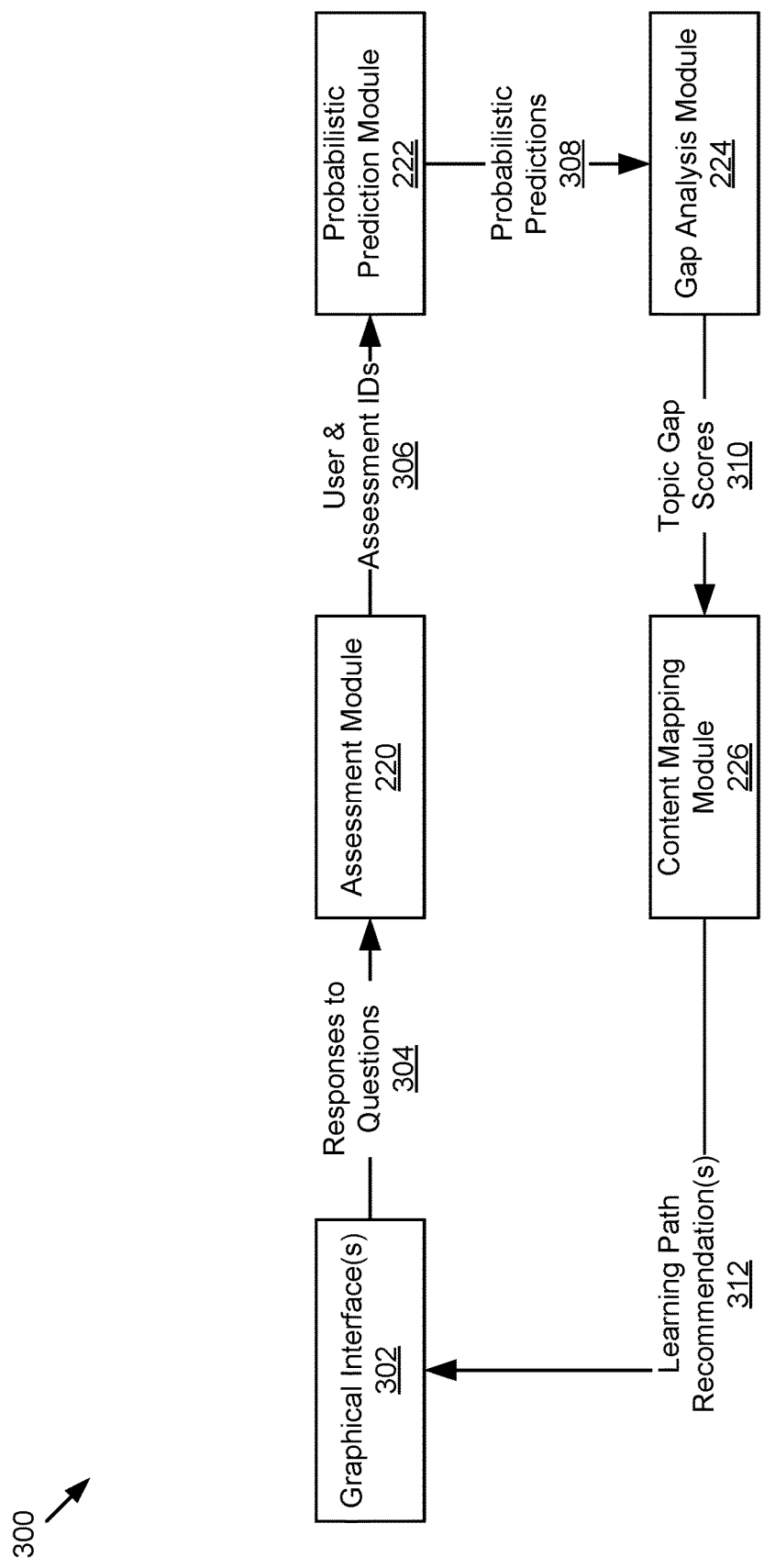
FIG. 3 is a data flow diagram illustrating an example application programing interface flow according to the techniques described herein.

FIG. 3 is a data flow diagram 300 illustrating an example application programming interface flow for enabling the techniques described herein. As illustrated in FIG. 3, graphical user interface(s) 302 (e.g., a front-end user interface) are presented to a user. The graphical interface(s) 302 provide various interfaces via which a user may answer questions, receive recommendations, and even receive and interact with instructional content items to improve the user's skills. The graphical interface(s) may present assessments including questions to the user and receive responses to the questions from the user. The graphical interface(s) may be coupled to the assessment module 220 to present questions (which may include skills tests, etc.) to the user and receive responses to those questions 304. For example, a user may use the graphical interface(s) 302 to complete a skill assessment, which may include one to many questions to assess the user's skills in one or more subjects, categories, topics, etc. For example, a user may navigate to a webpage (or use a dedicated desktop program or mobile application), which presents graphical interfaces and, in some instances, navigate to a learning path page, which may provide recommended learning paths, customized learning path(s), skills assessments, a catalog of instructional content, etc. The user may select a graphical element indicating that the user wishes to take a skills assessment. Graphical interface(s) 302 may then be presented to the user enabling the user to answer questions, perform skills tests, etc., which may be fed into the algorithms and systems described herein, for example, to determine the user's skill score representing their skills/competence in one or more subjects. The techniques described herein evaluate users based on fragmented responses, and may also allow calculations to be performed substantially faster than previous methods while consuming less computer resources. For example, the calculations can be performed as quickly as on the order of a millisecond.

The assessment module 220 provides assessments, including one or more questions, to users. In some implementations, the assessment module 220 retrieves questions from the question data 230 in the data store 212, although it may gather questions from the Internet, from user submitted questions, etc. In some implementations, the assessment module 220 may grade the assessments. For example, the assessment module 220 may grade user answers to questions against an answer key or rubric stored in the question data 230. The assessment module may transmit (or save to a mutually accessible data storage, such as the data store 212) user and assessment identifications 306 (including indications of which questions were answered or unanswered and which answers were answered correctly) to the probabilistic prediction module 222.

The probabilistic prediction module 222 evaluates questions answered by a user along with other data, such as question mapping data 234, to predict how the user would answer unanswered questions, as described herein. In some implementations, the probabilistic prediction module 222 predicts the probability that a user would answer an unanswered question correctly. For example, the probabilistic prediction module 222 may use a machine learning algorithm, such as a Bayesian network machine learning algorithm to predict how a user would answer questions.

The probabilistic prediction module 222 may include a question-relationships system with algorithms and data for extrapolating skill data from a user assessment, for example, using the question data 230 and the question mapping data 234. The probabilistic prediction module 222 may perform the operations described in further detail elsewhere in this disclosure, for example, one method for determining probabilistic predictions is described in reference to FIG. 5.

The probabilistic prediction module 222 outputs probabilistic predictions 308 for questions on an assessment, including those questions not answered by a user, to the gap analysis module 224. The gap analysis module 224 takes responses to questions answered by the user as well as the predicted responses of the user to unanswered questions and determines a skill level for the user. For example, the gap analysis module 224 uses the information provided by the probabilistic prediction module 222 to assess the strengths and weaknesses of the user on various facets (e.g., subjects, topics, subtopics, etc., tested) of an assessment, which may include those facets corresponding to the questions actually answered by the user and those corresponding to the questions left unanswered by the user. In particular, the gap analysis module 224 may determine one or more gaps in the user's understanding of a subject matter.

In some implementations, the gap analysis module 224 may organize the user into a cohort of users and determine skill levels of the user for one or more subjects, topics within a subject, and/or subtopics relative. The cohort of users may include users who are similar to the user, for example, in educational background, in skill levels for one or more subjects, topics, etc. In some instances, the gap analysis module 224 may rank order the user's strengths and weaknesses (e.g., topic scores or topic skill levels) among the cohort of users.

The gap analysis module 224 may assign a gap score or skill gap to topics assessed by the assessment (or even not assessed by the assessment, as if the unanswered questions weren't even presented to the user as part of the assessment). According to some implementations, an example method for assigning a gap score is described in reference to FIGS. 4A-4B herein. A gap score may represent gaps in the user's understanding relative to others, for example, in the same cohort of users for a topic or subtopic. For example, if an assessment tests various facets of users' knowledge of JavaScript, a particular user may be placed into a cohort of users with an intermediate skill level (or who have taken a particular learning path or course, etc.) over JavaScript or aspects thereof based on the assessment, for example, using the probabilistic predictions. The gap analysis module 224 may then determine that the particular user's understanding of a particular topic or subtopic, such as JSON, is lower than (e.g., by a defined or determined threshold) those of the other users in the same cohort to determine a topic gap score or skill gap. The topic gap scores 310 may then be sent to a content mapping module 226.

The content mapping module 226 uses algorithms and/or data for determining recommended content for a user based on the gap scores. For example, the content mapping module 226 may include a script to calculate learning module, course, or learning path relevance to the user's skill gap(s). In some implementations, the content mapping module 226 may also determine a map from assessment topics to modules (e.g., content mapping data 236).

The content mapping module 226 uses the strengths, weaknesses, and/or gaps in understanding of the user to find content, such as courses, modules, and/or learning paths, to teach the user those skills that were determined to be lacking by the gap analysis module 224. In some implementations, the content mapping module 226 may search content mapping data 236 in a data store 212 for content matching the weaknesses in the user's understanding, as determined using the techniques described herein. In some implementations, the content mapping module 226 may generate a search query specific to the user's strengths and weaknesses and then use the search query to search a content library for applicable instructional content. For example, the content mapping module 226 may search those parts of a content library within a learning path corresponding to the assessment, or the content mapping module 226 may search an entire content library having many subjects. Further, the content mapping module 226 may tailor multiple modules, courses, or learning paths specifically to the user based on that user's strengths and weaknesses. The operations of the content mapping module 226 are further described in reference to FIG. 6.

The content mapping module 226 may determine match scores (e.g., using the search query/document, the predicted probabilities, or gap scores) based on how closely these factors match content, for example. The content mapping module 226 may rank retrieved content based on the match scores and/or other factors (popularity, effectiveness, etc., of the content) to generate recommendations for content customized to the user. For example, the content mapping module 226 may communicate with the course engine 228 to generate a series of courses (e.g., a learning path) specialized to address the skill gaps of the user.

The content mapping module 226 may transmit the learning path recommendations 312 to the course engine 228 and/or to the graphical interface(s) 302 for presentation to the user. In some implementations, the graphical interface(s) 302 may format the recommendations for display to the user to place higher ranked recommendations at a more prominent region of a display. For example, the graphical interface(s) 302 may adapt to a type of user computing device 105 via which the recommendations are presented to the user. For instance, a desktop application may generate a scrollable or large format interface showing some or all of the recommendations, while a mobile device may automatically display those recommendations most tailored to the user's skill gaps (e.g., based on the ranking/match scores) and/or those recommendations for content most suited to the mobile device (e.g., based on screen size, computational capabilities, a touch screen, etc.). Accordingly, the computational efficiency, as well as the educational effectiveness, are be improved.

The user may use the graphical interface(s) 302 to select whether to access the suggested content/learning path recommendations and, in some instances, provided by the course engine 228. For instance, the course engine 228 may generate graphical representations of the content for display on the graphical interface(s) 302, or the recommendations may include computer links (e.g., hypertext link, a file system path, etc.) pointing to the content (which may be provided by the course engine 228, a third-party server, educational institution, etc.).

Figure 4A:
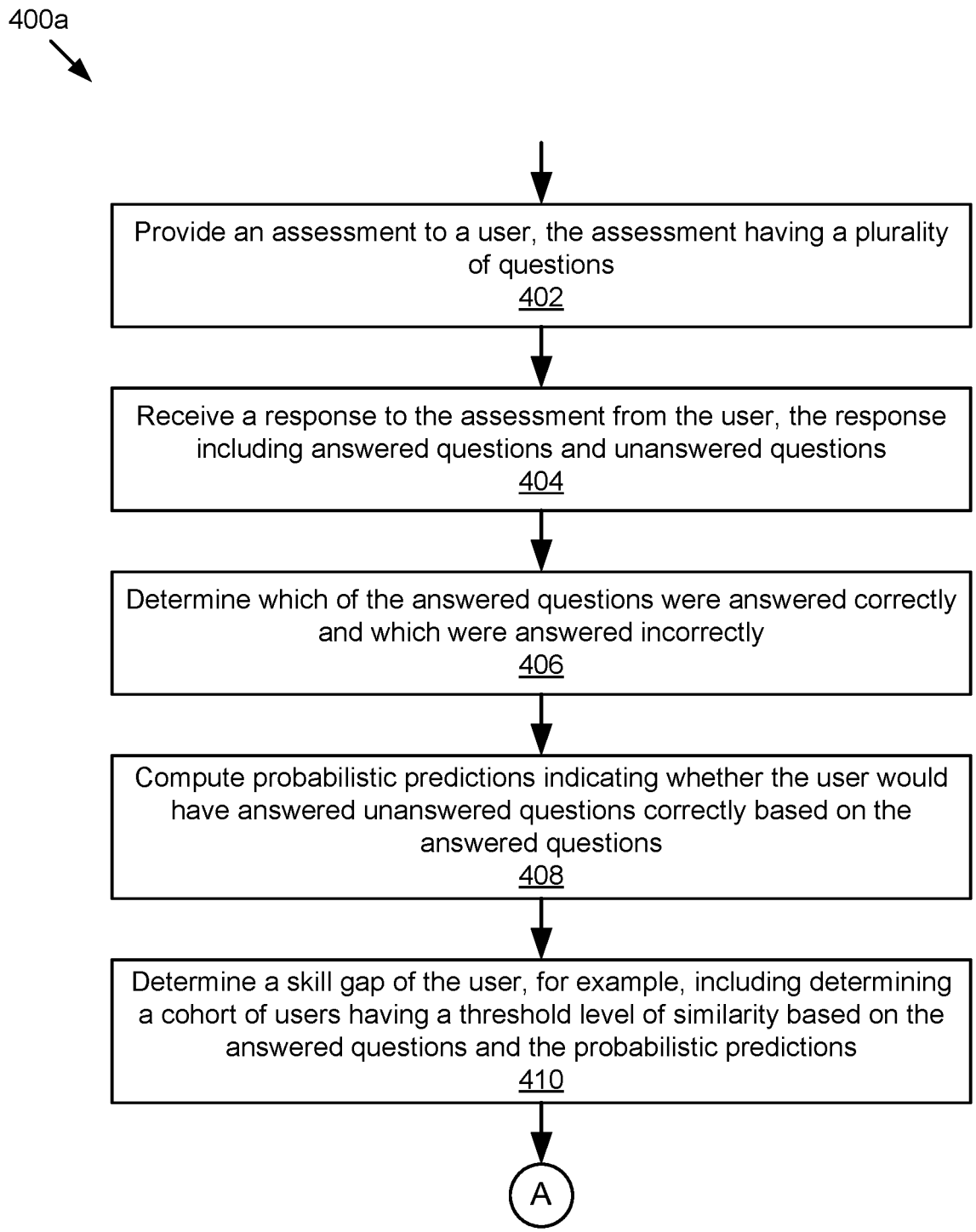
FIGS. 4A and 4B are flow diagrams illustrating an example method for determining skill gaps based on limited skills assessment information to provide recommended courses for improving those skills.
Figure 4B:
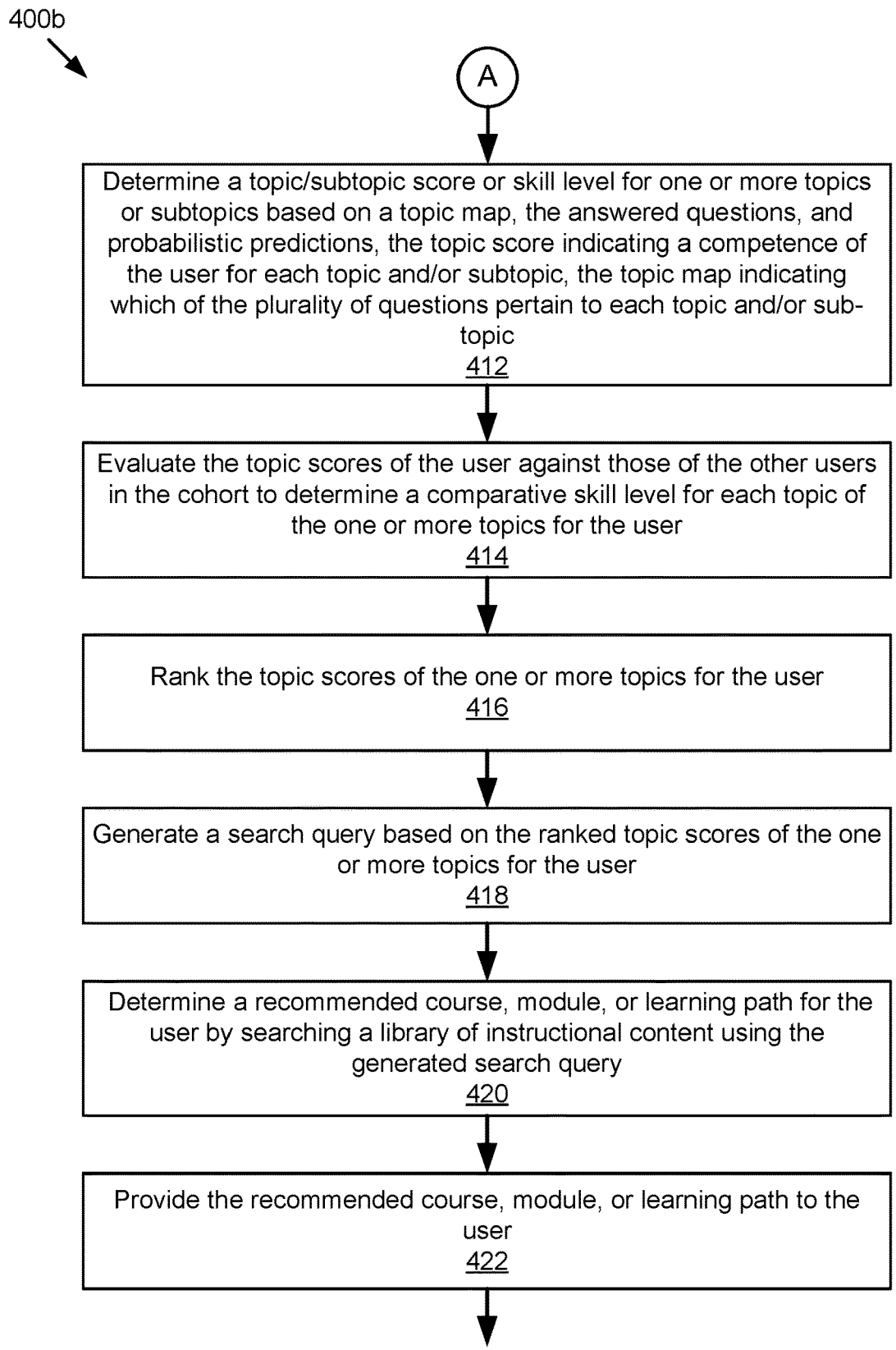

FIGS. 4A and 4B are flow diagrams illustrating an example method 400a-400b for determining skill gaps/gap scores based on limited skills assessment information to provide recommended courses for improving those skills.

At 402, the assessment module 220 provides an assessment to a user, which may have a plurality of questions. For example, a user can use an application user interface or navigate to a website (e.g., associated with the web server 216). Upon arriving at a learning path page for JavaScript, they may see an option to get their skill score for the subject of JavaScript. If the user selects that option, the assessment module 220 may provide the assessment to the user. In some implementations, the assessment module 220 provides, along with the assessment, the option to end the assessment whenever the user desires (e.g., prior to answering all of the questions).

At 404, the assessment module 220 receives response(s) to the assessment from the user, which may include answered questions and unanswered questions, and at 406, the assessment module 220 determines which of the questions answered by the user were answered correctly and which were answered incorrectly. The assessment module 220 may grade the answers against a stored answer key in real time (e.g., as the questions are answered) or after the assessment is completed (e.g., after the user elects to answer no more questions, after there are no more questions to answer, etc.).

At 408, the probabilistic prediction module 222 computes probabilistic predictions indicating whether the user would have answered unanswered questions correctly, based on the user's responses to the answered questions. In particular, the techniques described herein allow the probabilistic prediction module 222 to rapidly assign reliable scores without a user answering all questions in an assessment. Because a user may not answer all of the questions comprising a given assessment, identifying where a user lacks in skill and therefor needs to learn is a particular challenge. The probabilistic prediction module 222 may predict answers to unanswered questions or even scores on tests that a user has not taken in order to better ascertain a user's strengths and weaknesses. The probabilistic prediction module 222 may compute predicted probability of the user answering an unanswered question correctly using the answer to an answered question and based on question mapping data 234. Example methods for calculating the probabilistic predictions are described in further detail elsewhere herein, for example, in reference to FIG. 5.

The gap analysis module 224 may determine a topic cap score or a skill gap of the first user based on the user's answer to a question and the predicted probability. The topic gap score or skill gap represents competence (or lack thereof) of the user in a topic or subtopic. In some implementations, the gap analysis module 224 determines a skill gap of the user relative to a group or cohort of similar users (e.g., as described below).

At 410, the gap analysis module 224 determines a cohort of users that have a threshold level of similarity to the user based on the answered questions and, in some instances, the probabilistic predictions for unanswered questions (or some other shared attribute, skill level, etc.). For example, the gap analysis module 224 takes the user's answers and the probabilistic predictions and uses them to compare the user to other users who have taken the same assessment (or answered the same questions) and scored similar to the user, as described above. The other users who score within a threshold level of similarity comprise the user's cohort. For example, a cohort may consist of beginners in a particular topic.

At 412, the gap analysis module 224 determines a topic score (also referred to as a skill level) for one or more topics and/or subtopics (e.g., of a plurality of topics or subtopics in an assessment) based on a topic map. The topic map may indicate which questions pertain to a particular topic and may be stored in the content mapping data 236 in the data store 212. The topic score indicates a level of proficiency of the user for a topic. The topic score may be based on the topic map, the answered questions, and the probabilistic predictions.

The gap analysis module 224 may determine a skill level or topic score based on a skill level/topic score of the user satisfying a threshold score. In some implementations, the threshold score may be defined relative to skill scores of other users in the cohort. For example, at 414, the gap analysis module 224 evaluates the topic scores of the user against those of the other users in the cohort to determine a comparative skill level for the user for one or more of the topics tested in an assessment. The comparative skill level indicates the level of a user's proficiency relative to other users in the same cohort. For example, relative to others in the user's cohort or skill level, a user may be ranked as strong in some topics of a subject, but weak in other areas. In some implementations, the gap analysis module 224 may output the comparative skill level(s) to the user.

At 416, the gap analysis module 224 ranks the topic scores of the one or more topics for the user, for example, to generate the topic score/skill gap. For example, if there are 15 topics in a skill, the gap analysis module 224 may rank order the 15 topics from the user's best topic to the user's worst topic. The gap analysis module 224 may then select a defined number of topics, such as the user's three worst topics, for which to determine recommendations to the user for educational content.

In some implementations, the gap analysis module 224 may use a gap index that includes statistical measures for how other users rank for particular topics, for how important the topics are, etc. The gap analysis module 224 may apply the gap index to the rank ordering of the user's topic skills to add additional accuracy to the determination of the gaps in the user's understanding of a subject. For example, a user may be in a cohort of users classified as intermediate users for a topic. The gap index indicates that users in that cohort are expected to have skill scores or levels indicating competence in a number of subtopics under the topic. The gap index may also include a range of scores or rubric for determining the user's relative scores in one or several topics (or subtopics, etc.) score in comparison to the range of scores, rubric, or generally the other user's scores for that topic or subtopic. The skill gap may indicate that the user has a deficiency in skills satisfying a defined threshold relative to the other users in the cohort.

At 418, the content mapping module 226 may generate a search query based on the gap score, skill gap, and/or ranked topic scores of the one or more topics for the user and, at 420, the content mapping module 226 determines recommended instructional content for the user (e.g., customized to a gap score/skill gap of the user) by searching a library of instructional content using the generated search query. In some implementations, the data store 212 (e.g., course data 232 or content mapping data 236) does not contain a direct link between assessments and course catalogs, so which courses (or modules within a course) relate to which topics within an assessment may be identified. For example, some existing assessments cover broad subjects (e.g., a programming language, management approach, type of mathematics, or piece of software), while courses can correspond to those subjects or pertain to more specific components thereof.

Figure 6:
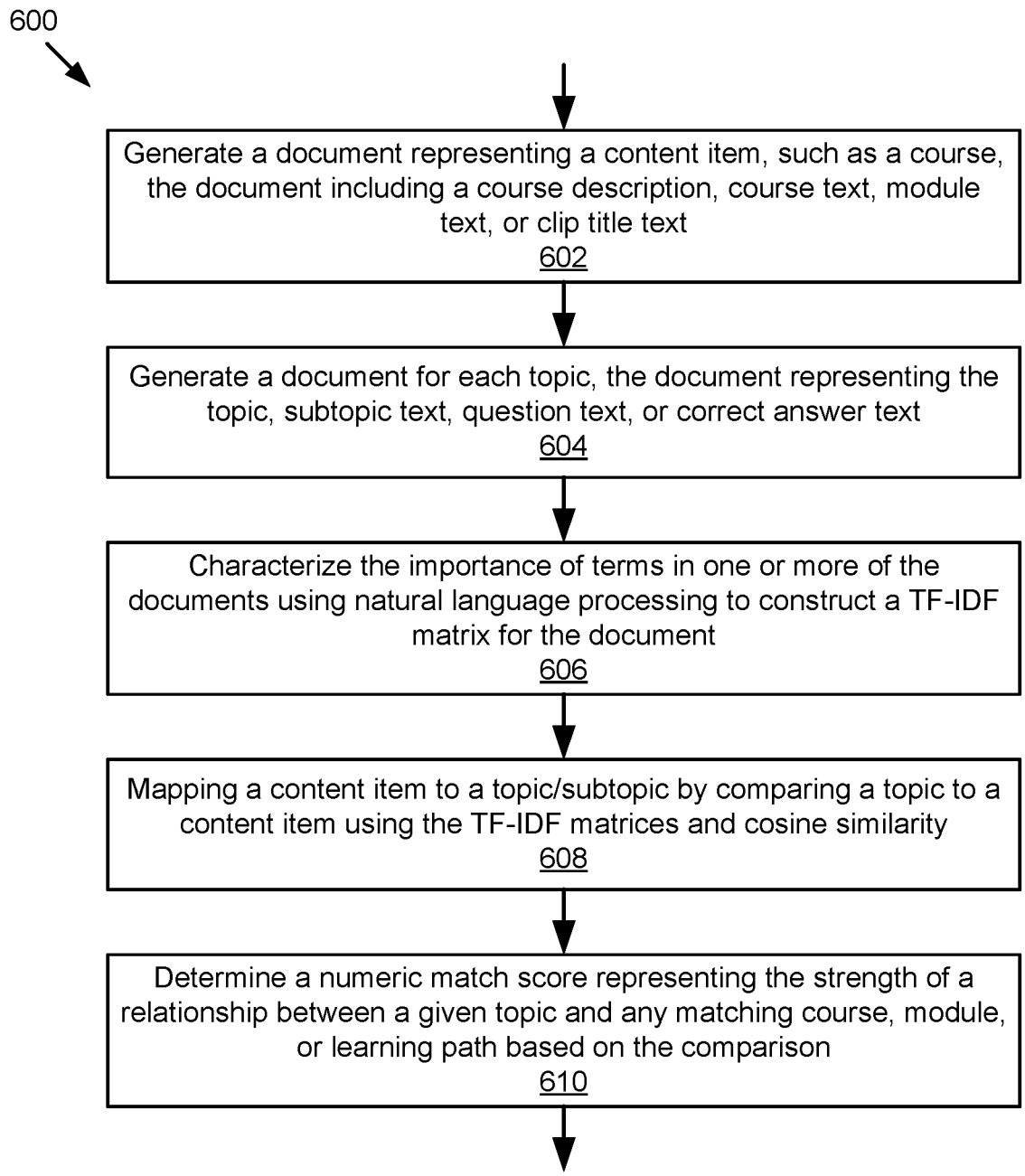
FIG. 6 is a flow diagram illustrating an example implementation of a method for generating an instructional database of content mapping data.

Accordingly, the content mapping module 226 may include an algorithm that maps an assessment topic to relevant courses, modules, or learning paths, for example, as described in further detail in reference to FIG. 6. This mapping enables the assessment engine 130, among other applications, to make targeted recommendations, build custom learning paths, and measure which courses result in the most learning. In effect, the content mapping module 226 takes the assessment topic descriptions and question text and queries it against the course library (e.g., in the course data 232). The content mapping module 226 may take the text that characterizes a topic, such as JavaScript functions, and query it against a JavaScript course library (or against a general course library). In some instances, the content mapping module 226 may calculate which modules and courses that it would recommend to the user, determine which learning path contains the most of those courses and modules, and then recommend that learning path to the user.

At 422, the content mapping module 226 and/or the course module may provide the recommendations to the user, along with an option to accept one or more of the recommendations. For instance, the course engine 228 may provide for display to the user by the user computing device 105 the recommended instructional content customized to the gap scores or skill gaps of the user, for example, the recommended instructional content may include the course, module, or learning path determined for the user based on the recommendations determined by the content mapping module 226 as described above.

Figure 5:
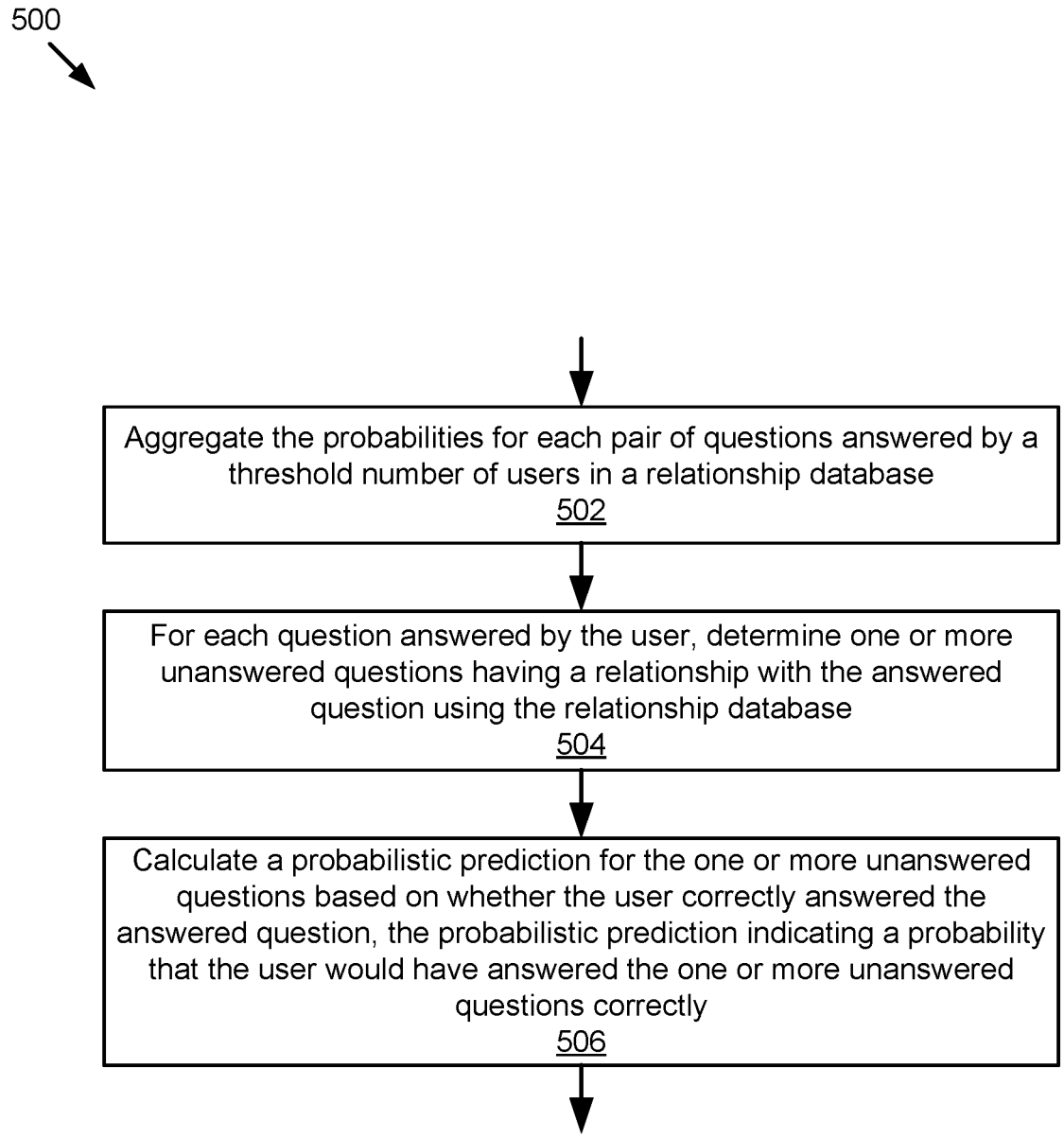
FIG. 5 is a flow diagram illustrating an example method for computing probabilistic predictions for predicting how a user would answer an unanswered question.

FIG. 5 is a flow diagram illustrating an example method for computing probabilistic predictions predicting how a user would answer an unanswered question. Because a user may not answer all of the questions in a given assessment, identifying where a user lacks in skill and therefor needs to learn is a unique challenge. The probabilistic prediction module 222 may predict answers to unanswered questions or even scores on assessments that a user has not taken.

At 502, the probabilistic prediction module 222 aggregates the probabilities for each pair of questions answered by a threshold number of users into a relationship database, such as the question mapping data 234, as described below. The probabilistic prediction module 222 takes, as inputs, the results of assessments at the question level. The question mapping data 234 may store relationships between questions in assessments with other questions in the system. For example, if more than 10 users have answered a pair of questions (correctly or, in some instances, at all), then that relationship is used in to infer likelihoods of correct answers. As an example, if a particular user has answered question A but has not answered question B, then the probability that the particular user would answer question B correctly may be inferred (e.g., from the user's answer of question A). If 10 users have submitted answers to both question A and question B, and 2 of those users answered both A and B correctly, 6 answered A correctly, and 3 answered B correctly, then the probability that the particular user would have answered question B correctly is 10% per Bayes' Theorem. Bayes' Theorem is provided as an example method for determining the probability of an event (e.g., answering an unanswered question correctly) based on factors (e.g., whether other users, potentially similar, users answered the question correctly) related to the event. The probabilistic predication module 222 may store the probability of a first question in each pair of questions being answered correctly based on responses to the second question in each pair of questions as question mapping data 234. It should be noted that other calculations and implementations are possible and contemplated herein.

At 504, the probabilistic prediction module 222, for one or more of the questions answered by the user, determines one or more unanswered questions (i.e., questions not answered by the user) having a relationship with the answered questions using the relationship database aggregated at 502. For example, if a user answers 20 questions in a 200 question assessment, the probabilistic prediction module 222 searches for questions out of the 200 that have a relationship to one or more answered questions. In some implementations, the 200 questions have a relationship, but some relationships may be stronger than others. In some instances, the probabilistic prediction module 222 generates predicted responses for those questions that have a threshold relationship strengths with one or more of the questions answered by the user. For example, relationships among questions may be determined based on observed correlations between questions, using cosine similarity, or using some other statistical or automated method, machine learning, manual mapping, etc.

Further, in some implementations, the probabilistic predictions and/or the relationships may be compounded over questions answered by the user. For instance, if 5 questions relate to a particular question and the responses of each of the 5 questions have different predicted probabilities that the particular question will be answered correctly, then the predicted probabilities for each of the 5 questions may be combined (e.g., added, normalized or averaged, combined using a strength of relevance between questions, etc.). For example, if a first 10 users answer question A correctly, but only 2 of the first 10 answer question X correctly and a second 10 users answer question B correctly, but 7 of the second 10 answer question X correctly, then it may be inferred that if a particular user answers A correctly, but B incorrectly, then the user is even more likely to answer question X incorrectly.

At 506, the probabilistic prediction module 222 calculates a probabilistic prediction for the one or more unanswered questions based on whether the user correctly answered the answered question, the probabilistic prediction indicating a probability that the user would have answered the one or more unanswered questions correctly, as described above. It should be noted that although it is described herein that a user may answer a question correctly or incorrectly, the methods may also apply to other types of questions and answers, such as whether the user skipped a question rather than answering it, which answer of multiple choices the user provided, the user's score on a skills test (e.g., where the user could have answered a percentage of the question correctly or in a certain way), etc. The calculation may use Bayes' Theorem or another statistical method for calculating a conditional probability that a given user will answer a given question correctly, given that they have answered another question correctly (or incorrectly), as described above, for example, in reference to 502.

The probabilistic prediction module 222 may calculate probabilities for pairs of questions (e.g., all questions, some questions, related questions, etc.), and aggregate them to predict responses to unanswered questions. For instance, predicted probabilities for multiple questions may be combined (e.g., added, combined using weights) for multiple answered questions to determine an aggregated probability for a particular question, subject, topic, etc. After receiving a request to predict responses, the probabilistic prediction module 222 outputs the user's actual answers along with a prediction (e.g., from 0 to 1) for whether the user would have answered other questions correctly (provided enough data or a threshold relationship level).

Although not illustrated in FIG. 5, the assessment engine 130 (or one of its components) may compress the data representing relationships among questions to store the relationships in question mapping data 234, using a compression algorithm. For example, the compression algorithm may be a combination of bitwise Boolean storage and sparse matrices using a fixed but tunable number of bytes (called block size). By combining these two techniques, the computing system 200 may take advantage of both techniques using bitwise operations to perform, for example, 64 calculations in parallel at a time, and sparse matrices to skip large chunks of calculations in the cases when values are zero (or when there are not enough co-occurrences of questions to make a reliable prediction). This compression algorithm provides substantial increases in processing speed for the techniques described herein, and may make it possible to run the calculations fast enough to make predictions in real time or near real time.

FIG. 6 is a flow diagram illustrating an example implementation of a method 600 for generating an instructional database, for example, of content mapping data 236, and in some implementations, using a search query to determine recommended instructional content using the database of instructional content. The method 600 may allow the techniques described herein to function even if there is not an explicit mapping between questions in an assessment and content item. Similarly, the method 600 may be configured to perform its operations without manually mapping relationships. The relationships generated by the content mapping module 226, for example, using the method 600 enables the assessment engine 130 to make recommendations targeted to the user, build custom learning paths of recommended content, and measure which courses result in the most learning.

At 602, the content mapping module 226 may generate a document (also referred to as a content document) representing a content item, such as a course, module, learning path, etc. The document may include a course description, course, module, and/or clip text, etc. For example, the document may include author tags, a description of the course (e.g., titles, summary, syllabus, descriptions, tags, module titles), and, in some instances course, module, and clip title text for a content item. In some implementations, the document may include transcript data of the content item (e.g., when the content item includes audio/video). In some instances, the content mapping module 226 may filter conversational noise (e.g., verbal communication not relative to the subject/learning goal of the content item) from the transcript data to improve recommendations.

At 604, the content mapping module 226 may generate a document (also referred to as a topic document) representing subjects (e.g., topics, subtopics, etc.), for example, in an assessment. For example, the document may include topic text (or title, identifier, etc.), subtopic text, question text, and correct answer text. In some implementations, the generation of the document may include concatenation of questions, correct answers, topic and subtopic descriptions, etc., that characterize a user's gap in understanding (e.g., as determined by the gap analysis module 224).

At 606, the content mapping module 226 may characterize the importance of terms in the document(s) (e.g., the content documents or topic documents) using natural language processing to construct a term frequency-inverse document frequency (TF-IDF) matrix for the document. For example, the TF-IDF matrix characterizes the most important terms and words (e.g., terms or words having a threshold level of importance, as described below) in each input document, such as that for courses, modules, topics, etc. For example, the TF-IDF may weight words, so that more important words are more likely to be searched, retrieved, etc. It should be understood that other implementations are possible and contemplated.

At 608, the content mapping module 226 may map a content item to a topic or subtopic by comparing a topic/subtopic to a content item using TF-IDF matrix(ces) and cosine similarity. For example, the content mapping module 226 may compare a topic (e.g., topics or subtopics in an assessment, database, document, etc.) to a content item (e.g., course, module, path, etc. in a catalog, database, document, group of content items, etc.) using the TF-IDF matrices using cosine similarity. For example, the calculation of these matrices allows the content mapping module 226 to compare courses to topics, using cosine similarity. For example, cosine similarly is a measure of the angle between two vectors in N-dimensional space, using which, documents, matrices, or vectors can be compared to determine a level of similarity. For example cosine similarity can map the most important terms in each document (e.g., topic documents and content documents) together using cosine similarity to determine which terms and/or documents most closely match, thereby mapping the content items to the topics and/or subtopics. Accordingly, subjects (e.g., topics, sub topics, etc.) can be compared with content items in advance or in real time to generate a potentially weighted mapping of content to topics, questions, etc. It should be understood that other implementations and methods of mapping are possible and contemplated.

At 610, the content mapping module 226 may determine a numeric match score representing the strength of a relationship between a given topic and any matching course, module, or learning path based on the comparison, for example, based on the weights of the cosine similarity. In some implementations, the content mapping module 226 outputs a match score (e.g., a similarity metric or numeric match score) between 0 and 1 representing the strength of the relationship between a given topic and any matching course and module. Once the similarity metrics are calculated, the content mapping module 226 uses the matches between content items (e.g., courses, modules, etc.) and subjects/topics to identify one or more (e.g., as in a learning path) content items for one or more of the topics, subtopics, etc., in the assessment, for instance using the ranking or threshold based on the numeric match score.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CDROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of an entirely hardware implementation, an entirely software implementation or an implementation containing both hardware and software elements. One implementation is implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The foregoing description of the implementations has been presented for the purposes of illustration and description. It is not intended to be exhaustive or to limit the specification to the precise form disclosed. Many modifications and variations are possible in light of the above teaching. For example, the described methods may include additional for fewer steps and may be performed in a different order than that described. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for generating customized instructional content recommendations, comprising:
    receiving, by a computing device, an answer to a question of a set of questions from a first user, the set of questions including an unanswered question to which the first user has not responded;
    computing, by the computing device, a predicted probability of the first user answering the unanswered question correctly using the answer to a first question and based on question mapping data, the question mapping data representing a relationship between the question and the unanswered question;
    determining, by the computing device, a plurality of topic scores of the first user for a plurality of topics based on a topic map, the topic map including a mapping between topics and questions in the set of questions;
    calculating, by the computing device, a skill level of the first user based on the answer to the question and the predicted probability of the first user answering the unanswered question correctly, the skill level representing a level of a skill of the first user in one or more topics;
    ranking, by the computing device, the skill level of the first user against skill levels of a plurality of second users;
    defining, by the computing device, a cohort to include one or more second users of the plurality of second users based on the ranked skill level and a similarity of the one or more second users to the first user, wherein:
        the one or more second users have a threshold level of similarity to the first user, the one or more second users are determined based on comparison of:
            the answer to the question of the first user with answers to the question of the one or more second users, and
            the predicted probability of the first user answering the unanswered question correctly with predicted probabilities of the one or more second users answering the unanswered question correctly;
    determining a skill gap of the first user indicating a deficiency of the first user in the level of the skill in the one or more topics based on a topic score of the first user satisfying a threshold score, wherein:
        the threshold score is defined relative to the cohort, and
        the skill gap is based on first user's answer to a question and the predicted probability of the first user answering the unanswered question correctly;
    generating, by the computing device, a search query based on the skill gap of the first user;
    searching, by the computing device, a database of instructional content using the search query indicating the skill gap of the first user;
    determining match scores based on match of the search query indicating the skill gap of the first user with the instructional content;
    ranking the instructional content based on the match scores indicative of the match of the search query with the instructional content, to generate recommended instructional content customized to the skill gap of the first user; and
    providing, by the computing device, for display to the first user, the recommended instructional content customized to the skill gap of the first user.

2. A method comprising:
    receiving, by a computing device, an answer to a question of a set of questions from a first user, the set of questions including an unanswered question to which the first user has not responded;
    computing, by the computing device, a predicted probability of the first user answering the unanswered question correctly using the answer to the question and based on question mapping data, the question mapping data representing a relationship between the question and the unanswered question;
    determining, by the computing device, a skill gap of the first user indicating a deficiency of the first user in a level of a skill in one or more topics, wherein the skill gap is based on first user's answer to the question and the predicted probability of the first user answering the unanswered question correctly, the skill gap representing competence of the first user in a topic;

generating, by the computing device, a search query based on the skill gap of the first user;

searching, by the computing device, a database of instructional content using the search query indicating the skill gap of the first user;

determining match scores based on match of the search query indicating the skill gap of the first user with the instructional content;

ranking the instructional content based on the match scores indicative of the match of the search query with the instructional content, to generate recommended instructional content customized to the skill gap of the first user; and providing, by the computing device, for display to the first user, the recommended instructional content customized to the skill gap of the first user.

3. The method of claim 2, further comprising:

aggregating, by the computing device, pairs of questions in the set of questions, the pairs of questions being answered by a threshold number of second users;

calculating, by the computing device, a probability of a first question in each pair of questions being answered correctly based on responses to a second question in each pair of questions based on responses by the threshold number of second users to that pair of questions; and storing, by the computing device, as question mapping data, the probability of the first question in each pair of questions being answered correctly based on the responses to the second question in each pair of questions.

4. The method of claim 3, wherein calculating the probability of the first question in each pair of questions being answered correctly based on the responses to the second question in each pair of questions is performed using Bayes' Theorem.

5. The method of claim 2, further comprising generating, by the computing device, the database of instructional content including: generating content documents representing content items; generating topic documents representing topics; and mapping the content items to the topics using the content documents and the topic documents.

6. The method of claim 5, wherein mapping the content items to the topics includes: determining an importance of terms in the content documents and the topic documents using a term frequency-inverse document frequency matrix; and mapping the content items to the topics using cosine similarity and the importance of terms in the content documents and the topic documents.

7. The method of claim 2, wherein calculating the skill gap of the first user includes: determining a plurality of topic scores of the first user for a plurality of topics based on a topic map, the topic map including a mapping between topics and questions in the set of questions; and determining the skill gap of the first user based on a topic score of the first user satisfying a threshold score.

8. The method of claim 7, wherein the threshold score is defined relative to a cohort of second users, the cohort of second users having a threshold level of similarity to the first user, the cohort of second users is determined based on comparison of:

the answer to the question of the first user with answers to the question of the cohort of second users, and the predicted probability of the first user answering the unanswered question correctly with predicted probabilities of the cohort of second users answering the unanswered question correctly.

9. The method of claim 8, further comprising determining, by the computing device, the cohort of second users, wherein determining the cohort of second users includes: calculating a skill level of the first user based on the answer to the question and the predicted probability of the first user answering the unanswered question correctly, the skill level representing the level of the skill of the first user in the one or more topics; ranking the skill level of the first user against skill levels of a plurality of second users; and defining the cohort to include users of the plurality of second users based on the ranked skill level.

10. A system comprising:

one or more processors; a non-transitory computer readable medium storing instructions that, when executed by the one or more processors, cause the one or more processors to: receive an answer to a question of a set of questions from a first user, the set of questions including an unanswered question to which the first user has not responded;

compute a predicted probability of the first user answering the unanswered question correctly using the answer to a first question and based on question mapping data, the question mapping data representing a relationship between the question and the unanswered question;

determine a skill gap of the first user indicating a deficiency of the first user in a level of a skill in one or more topics, wherein the skill gap is based on first user's answer to the question and the predicted probability of the first user answering the unanswered question correctly, the skill gap representing competence of the first user in a topic;

generating, by a computing device, a search query based on the skill gap of the first user;

searching, by the computing device, a database of instructional content using the search query indicating the skill gap of the first user;

determining match scores based on match of the search query indicating the skill gap of the first user with the instructional content;

ranking the instructional content based on the match scores indicative of the match of the search query with the instructional content, to generate recommended instructional content customized to the skill gap of the first user; and provide for display to the first user, the recommended instructional content customized to the skill gap of the first user.

11. The system of claim 10, wherein the instructions further cause the one or more processors to: aggregate pairs of questions in the set of questions, the pairs of questions being answered by a threshold number of second users; calculate a probability of a first question in each pair of questions being answered correctly based on responses to a second question in each pair of questions based on responses by the threshold number of second users to that pair of questions; and store as question mapping data, the probability of the first question in each pair of questions being answered correctly based on the responses to the second question in each pair of questions.

12. The system of claim 11, wherein calculating the probability of the first question in each pair of questions being answered correctly based on the responses to the second question in each pair of questions is performed using Bayes' Theorem.

13. The system of claim 10, wherein the instructions further cause the one or more processors to generate the database of instructional content including: generating content documents representing content items; generating topic documents representing topics; and mapping the content items to the topics using the content documents and the topic documents.

14. The system of claim 13, wherein mapping the content items to the topics includes: determining an importance of terms in the content documents and the topic documents using a term frequency-inverse document frequency matrix; and mapping the content items to the topics using cosine similarity and the importance of terms in the content documents and the topic documents.

15. The system of claim 10, wherein calculating the skill gap of the first user includes: determining a plurality of topic scores of the first user for a plurality of topics based on a topic map, the topic map including a mapping between topics and questions in the set of questions; and determining the skill gap of the first user based on a topic score of the first user satisfying a threshold score.

16. The system of claim 15, wherein the threshold score is defined relative to a cohort of second users, the cohort of second users having a threshold level of similarity to the first user, the cohort of second users is determined based on comparison of:
the answer to the question of the first user with answers to the question of the cohort of second users, and
the predicted probability of the first user answering the unanswered question correctly with predicted probabilities of the cohort of second users answering the unanswered question correctly.

17. The system of claim 16, wherein the instructions further cause the one or more processors to determine the cohort of second users, wherein determining the cohort of second users includes:
calculating a skill level of the first user based on the answer to the question and the predicted probability of the first user answering the unanswered question correctly, the skill level representing the level of the skill of the first user in the one or more topics;
ranking the skill level of the first user against skill levels of a plurality of second users; and
defining the cohort to include users of the plurality of second users based on the ranked skill level.

* * * * *